United States Patent [19]

Davis et al.

[11] Patent Number: 4,886,241
[45] Date of Patent: Dec. 12, 1989

[54] VALVE STEM PACKING CONTAINMENT FOR HIGH PRESSURE, HIGH TEMPERATURE

[75] Inventors: James R. Davis; Robert T. Wilson, both of Marshalltown, Iowa

[73] Assignee: Fisher Controls International, Inc., Clayton, Mo.

[21] Appl. No.: 97,617

[22] Filed: Sep. 16, 1987

[51] Int. Cl.[4] .................... F16K 41/04; F16J 15/20; F16J 15/40

[52] U.S. Cl. ................................ 251/214; 277/59; 277/72 FM; 277/105; 277/124; 277/188 A; 277/205

[58] Field of Search ............... 251/214; 277/105, 112, 277/124, 125, 205, 72 FM, 188 A, 17, 19, 59

[56] References Cited

U.S. PATENT DOCUMENTS

| | | | |
|---|---|---|---|
| 2,973,978 | 3/1961 | Oppenheim | 277/188 A |
| 3,009,721 | 11/1961 | Newton | 277/188 A |
| 3,106,407 | 10/1963 | Mattingly | 277/188 A |
| 3,397,893 | 8/1968 | Kampert | 277/124 |
| 3,907,307 | 9/1975 | Maurer et al. | 277/124 |
| 4,061,157 | 2/1977 | Hansen | 251/214 |
| 4,169,605 | 10/1979 | Nishimoto et al. | 277/188 A |
| 4,177,998 | 12/1979 | Laitkep et al. | 277/124 |
| 4,234,197 | 11/1980 | Amancharla | 277/125 |
| 4,283,062 | 8/1981 | Catanzaro et al. | 277/105 |
| 4,364,542 | 12/1982 | Meyer | 277/59 |
| 4,433,847 | 2/1984 | Weinberg | 277/125 |
| 4,440,404 | 4/1984 | Roach et al. | 277/124 |
| 4,475,712 | 10/1984 | DeJager | 251/214 |
| 4,476,772 | 10/1984 | Gorman et al. | 277/205 |
| 4,512,586 | 4/1985 | Smith | 277/105 |
| 4,552,369 | 11/1985 | Stewart et al. | 277/188 A |
| 4,602,791 | 7/1986 | Zöllner | 277/188 A |

Primary Examiner—George L. Walton
Attorney, Agent, or Firm—Marshall, O'Toole, Gerstein, Murray & Bicknell

[57] ABSTRACT

A fluid valve for use in elevated pressure and temperature conditions. Composition material wiper rings are provided in the packing bore between the packing follower and the packing box ring. The composition wiper rings have an inner diameter substantially the same as the valve stem diameter to inhibit the extrusion of packing material during sliding valve operation.

6 Claims, 3 Drawing Sheets

VALVE STEM PACKING CONTAINMENT FOR HIGH PRESSURE, HIGH TEMPERATURE

This invention relates to valve structures used in controlling the flow of fluids, and in particular to an improved valve stem packing containment for sliding stem valves useful in high pressure and high temperature environments.

BACKGROUND OF THE INVENTION

Normally, fluid valve structure applications occur in environments where the pressure is less than about 1000 psi (68.95 Bars) and the temperature of the fluid is less than about 200° Fahrenheit (94° Celsius). However, certain applications of fluid valves require use in high pressure and high temperture environments. As an example, in the control of boiler feed water in power generating plants there is a requirement for fluid valves operating in pressures around 7200 psi (496 Bars) and in temperature ranges of around 450° Fahrenheit (232° Celsius). Normally, valves operating in such pressure and temperature extremes use graphite packing material rather than TFE (tetrafluorethylene) packing material due to the limiting usage of TFE at the elevated temperatures and pressure. The use of graphite packing leads to increased valve stem friction as the valve stem strokes through the packing thereby severely limiting valve operation and leading to increased wear on the packing material.

However, prior attempts to utilize TFE packing at the elevated pressure and temperature ranges was normally not recommended nor found feasible. In such attempts, it was found that the TFE packing material extruded due to the severe pressures and sliding movement of the valve stem which tended to remove the material from the packing in long strands of string-like extrusions. Eventually, the continued removal and extruding of material from the packing led to a loss of sealing ability for the packing and thereby requiring early replacement of the packing material and possibly the valve stem itself.

Accordingly, it is desired to provide an improved valve stem packing containment for use in high pressure, high temperature conditions which can provide reliable service with a minimum of friction between the sliding valve stem and the packing material and with a minimum of service required. It is also desired that a valve stem packing containment be provided which can extend the useful valve life even in non-elevated pressure and temperature conditions.

SUMMARY OF THE INVENTION

In accordance with the principles of the present invention, there is provided an improved valve stem packing containment for use in sliding valves and which is particularly useful in high pressure and high temperature conditions. The packing containment includes anti-extrusion wiper rings within the packing bore and on each side of the packing material to inhibit the extrusion of packing material during normal sliding valve operation. In accordance with one aspect of the present invention, it has been found that wiper rings formed of a composition material such as a type known in the industry as used for general purpose gasketing provides an effective means of not only inhibiting the extrusion of packing material but also maintaining any such extruded material within the packing bore.

As compared to the known prior art packing configurations, the present invention utilizes anti-extrusion wiper rings of sufficient hardness and having an inner diameter which is substantially the same as the valve shaft diameter.

In a constructed embodiment of the invention utilizing a double packing configuration with a pair of 1/16th inch thick wiper rings on each side of a TFE packing set, standard industry cycling tests were performed in which the valve was operated under changing high pressure and high temperature conditions. Under test conditions simulating about a year of valve usage, no measured amount of leakage was detected.

In a preferred embodiment of the invention, V-type TFE packing is utilized with wiper rings on either side of the packing. The wiper rings in their preferred form are composed of high temperature organic and/or inorganic fibers with an elastomeric binder. This configuration was maintained within the packing bore by an upper packing follower and a lower packing box ring. The undesired extrusion of packing material on the inside diameter is effectively inhibited. It is preferred that the packing box ring and the packing follower include a close tolerance portion with respect to the packing bore in order to effectively inhibit extrusions on the packing material outside diameter.

Either single or double packing type configurations may be utilized as desired. In addition, instead of the preferred thin flat type wiper rings, standard O-ring type configurations may be substituted. It may be noted that the present invention is useful to inhibit packing extrusion even under less demanding pressure and temperature conditions. Accordingly, the aforementioned upper and lower wiper rings may be utilized in valve structures operating in such less demanding pressure and temperature conditions to similarly inhibit packing extrusion and thereby prolong valve packing life.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like references numerals identify like elements in the several figures and in which:

DETAILED DESCRIPTION

Figure 1:
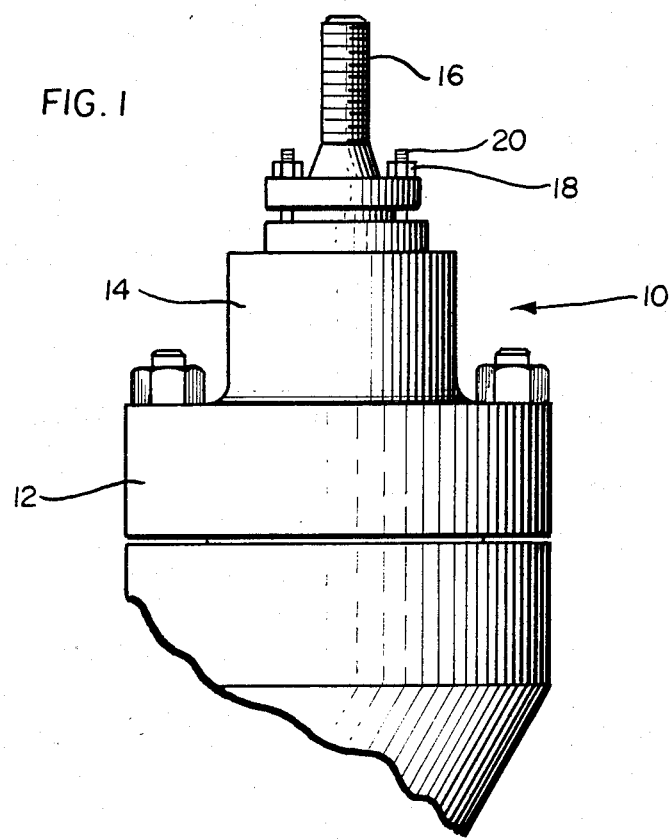
FIG. 1 is a fragmented elevational view illustrating a fluid valve structure incorporating the present invention.

Reference may be made to FIG. 1 in which there is illustrated a fluid valve 10 which includes a valve body 12 having a valve bonnet 14 through which is extended a valve stem 16. Packing nuts 18 are threadably mounted on packing studs 20 so as to adjust the loading on packing within the bonnet and around the valve stem.

Figure 2:
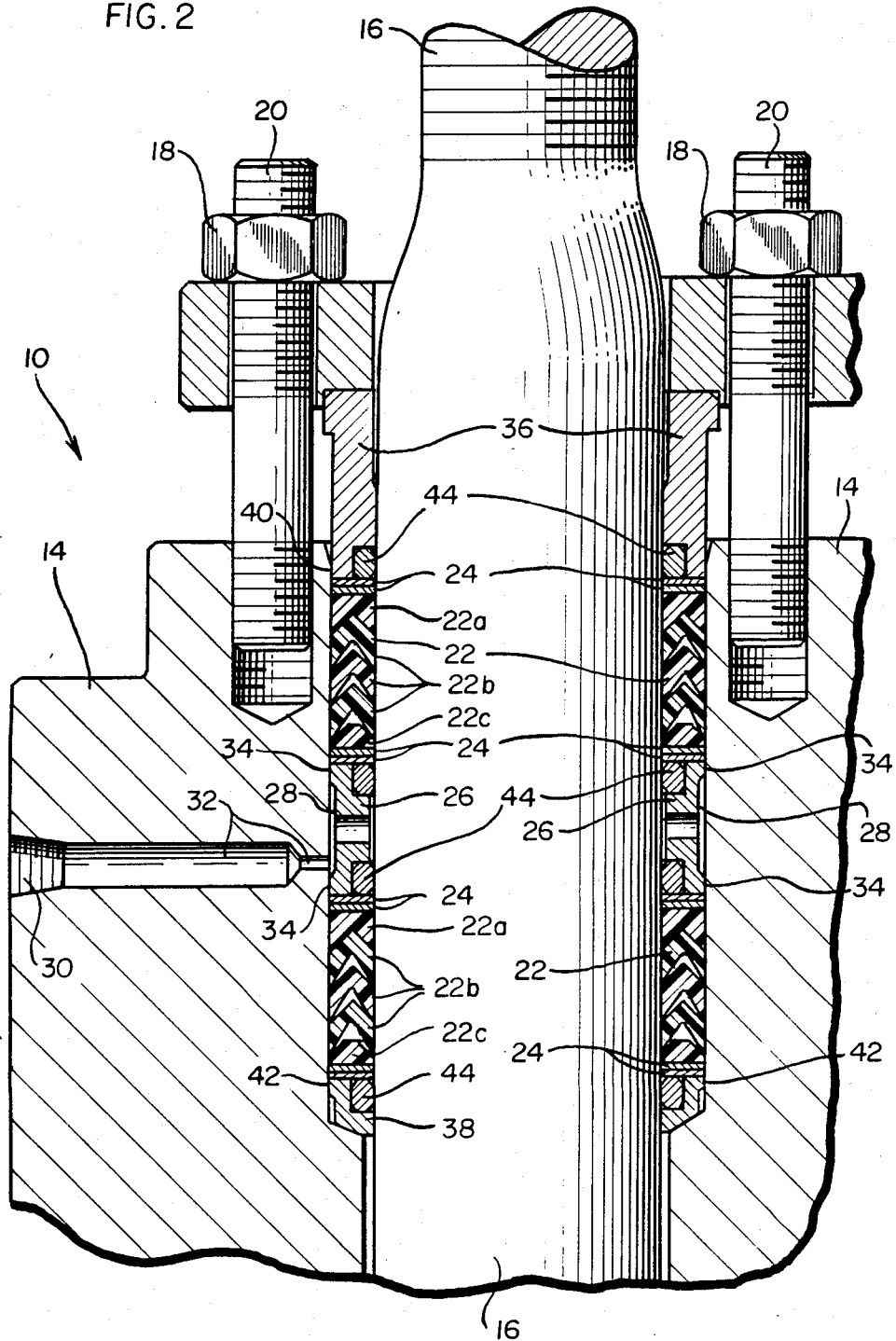
FIG. 2 is a fragmented cross-sectional view illustrating the double packing configuration and including the wiper rings in accordance with one aspect of the present invention.

Referring now to FIG. 2, there is illustrated a preferred embodiment of a double packing configuration. A packing 22 surrounds valve stem 16 and is formed of a series of rings of the type commonly referred to as V-type packing. As shown in FIG. 2, there is an upper and lower packing set. Each set contains five V-rings including a top female ring 22a; three identical middle rings 22b; and a bottom male ring 22c. V-type packing 22 is formed of TFE (tetrafluorethylene—a synthetic resin polymer) and therefore packing 22 is known in the trade as "V-type TFE packing". Packing suitably formed of other material, or of other synthetic resin polymers, may be utilized.

Two anti-extrusion wiper rings 24 are located at each end of packing 22. Each wiper ring is formed of a composition material and has an inner diameter substantially the same size as the valve stem diameter. A most useful composition material has been found to be one of high temperature organic and/or inorganic fibers with a nitrile elastomeric binder such that the hardness rating is about 90 plus or minus 5 Shore "B" Durometer. Preferably the material should contain no asbestos or cellulose fiber.

It has been found when anti-extrusion wiper rings 24 are formed of such a composition material and when the wiper ring inner diameter is substantially the same as the valve stem diameter, that the extrusion of material from packing 22 during normal valve operation is inhibited. Without the described wiper rings, significant extrusion of the TFE packing material was experienced under pressures of around 7,200 psi and at elevated temperatures of about 450° Fahrenheit. This undesired extrusion significantly reduces the valve life in that the packing and the valve stem then needs to be replaced quite frequently. On the other hand, in tests using the TFE packing at the elevated pressures and temperatures as before recited, it was found that the use of the composition wiper rings effectively inhibited packing material extrusion during normal sliding valve operation. Therefore sealing integrity of the valve stem packing is maintained.

It is believed that extrusion of the packing material during valve operation is inhibited by the wiping action of wiper rings 24 on the valve stem, thereby tending to prevent long strands of string-like TFE material from forming or from continuing to form as the valve stem is driven through the packing. Secondly, it is believed the wiper rings tend to maintain any slightly extruded surface material from the packing to be contained within the packing area or at least within the packing containment structure. The anti-extrusion wiper rings wiping action and containment is enabled by the use of a sufficiently hard wiper ring material as previously described and by the wiper ring inner diameter substantially matching the valve stem inner diameter. It is preferred that the wiper ring inner diameter have a slight interference fit with the valve stem to insure desired wiper ring operation of the present invention. The desired wiper ring and valve stem operation can be achieved even if the wiper ring is a few thousandths of an inch larger than the valve stem.

A lantern ring 26 is placed around the valve stem and between the two packing sets. As in the conventional use of lantern rings in valves, lantern ring 26 further is adapted in packing bore 28 to enable communication from the valve exterior via access hole 30 and connecting channels 32. This permits lubricating fluid to be inserted into the packing bore and adjacent valve stem 16, and to permit testing for any leakage around the valve stem. In the present situation, lantern ring 26 includes perimeter portions 34 which are sized to provide a close tolerance, i.e. 0.002 to about 0.005 inch diameter tolerance, between the outside diameter of perimeter portion 34 and the diameter of packing bore 28. It has been found that by providing such close tolerance portions 34 that this inhibits any extrusions of material from the packing outer diameter or at least significantly reduces any such packing material extrusion.

The packing is maintained under suitable loading in the packing bore by means of a packing follower 36 at the upper end of valve stem 16, and a packing box ring 38 at the lower end thereof. As in the case of the lantern ring, packing follower 36 includes a perimeter portion 40 having a close tolerance between the outside of perimeter portion 40 and the packing bore. Similarly, packing box ring 38 includes a perimeter portion 42 with a similar close tolerance. Suitable loading of the packing on stem 16 is provided by adjusting packing nuts 18 on packing studs 20. Conventional guide rings 44 of graphite material are provided in the packing follower, lantern ring and packing box ring—all of which may be suitably formed of stainless steel.

Figure 3:
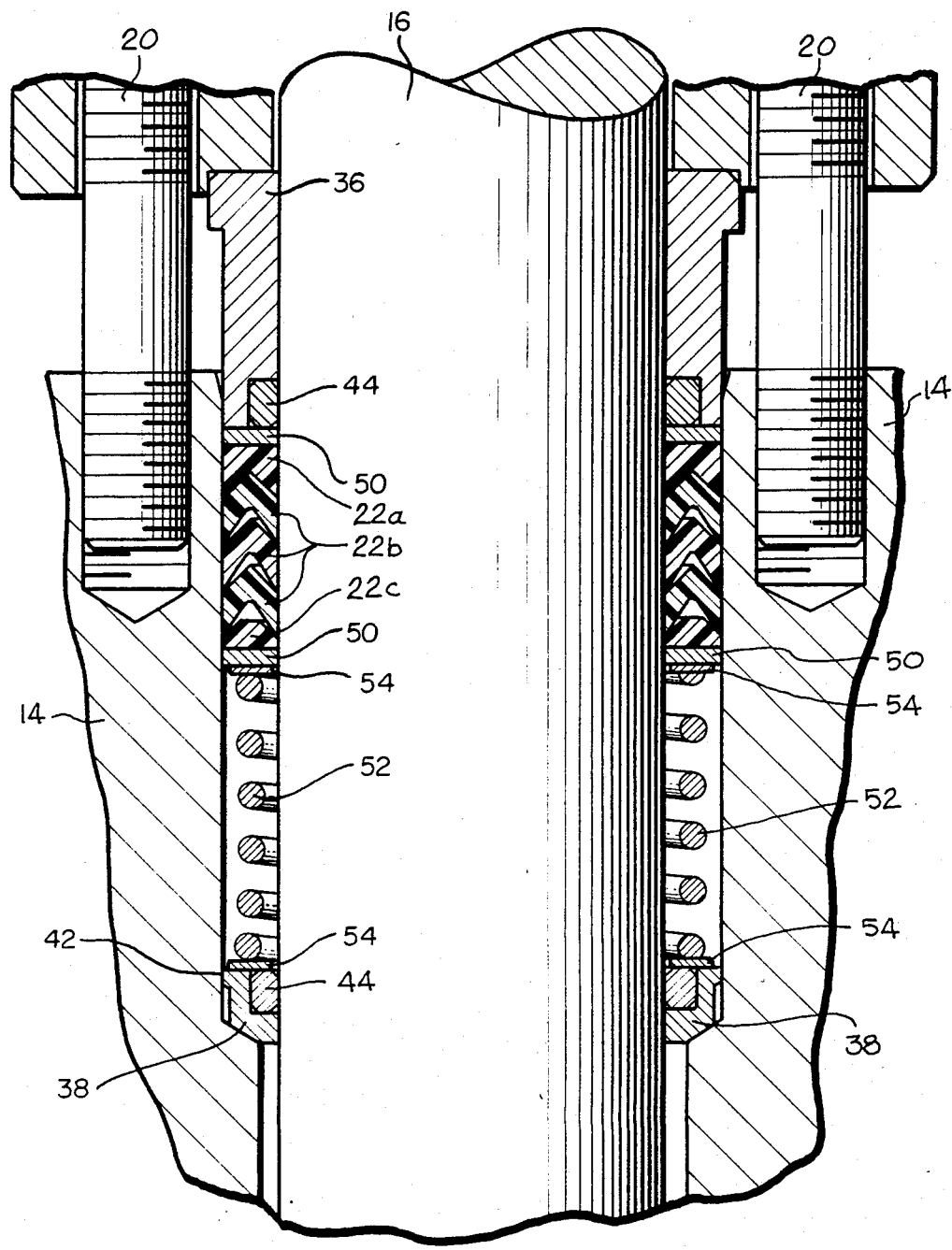
FIG. 3 is a fragmented sectional view illustrating a single packing configuration in accordance with another aspect of the present invention.

Referring to FIG. 3, there is illustrated an embodiment of the invention incorporating a single V-type TFE packing. In this instance, a single wiper ring 50 is formed as previously described in connection with wipers 24, except the thickness of wiper ring 50 is about twice that of each single wiper ring 24. Alternatively, two smaller wipers may be used in place of the illustrated single layer wiper. A packing follower 36 and guide ring 44 are located on the valve stem above upper wiper ring 50 and packing 22. A coil spring 52 suitably formed of, for example, stainless steel is located around the valve stem below packing 22 and lower wiper ring 50. A metal washer 54 is placed at each end of the coil spring to provide a firm spring base and prevent deformation of the composition material wiper ring. Packing box ring 38 and guide ring 44 complete the packing containment structure.

Figure 4:
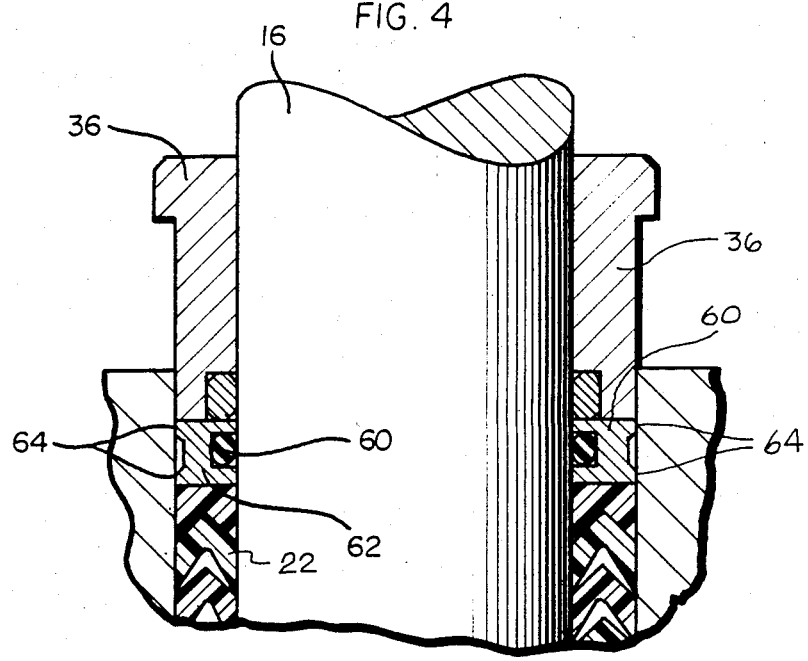
FIG. 4 is a fragmented sectional view illustrating the use of an O-ring as an alternative embodiment of the present invention.

Rather than single or double flat wiper rings of composition material, other shapes and other material may be used so long as extrusion of packing material is inhibited. As an example, FIG. 4 illustrates an O-ring wiper 60 held around the valve stem by a retainer 62 at the upper and lower ends of packing 22. The O-rings can be formed of a hard rubber or hard elastomeric resin material and with an inner diameter substantially the same as the valve stem diameter to inhibit packing material extrusion during normal valve operation. Also, the O-ring retainers can be formed with close tolerance perimeter portions 64 as previously described to inhibit extrusion of the packing outer diameter.

Whereas the invention has been described in connection with a sliding stem control valve, it is to be understood that the principles can be applied to any situation employing a reciprocating member with a packing seal, such as a pump, air or hydraulic cylinder, etc.

The foregoing detailed description has been given for clearness of understanding only, and no unnecessary limitations should be understood therefrom, as modifications will be obvious to those skilled in the art.

What is claimed is:

1. A fluid valve for use in high pressure and high temperature condition around 7200 psi (506 kscm) and 450° F. (232° C.), said fluid valve comprising:

a valve body;

a valve stem movably mounted within said valve body for operating said valve;

a valve bonnet mounted to said valve body and adapted to receive said valve stem, including a packing bore within said valve bonnet to surround the outer diameter of said valve stem;

packing loading means at opposite ends of said packing bore;

a pair of synthetic resin polymer packing assemblies in said packing bore formed of TFE material for normal valve operation in environments having temperature ranges around 450° F. (232° C.) and surrounding the outer diameter of said valve stem, each of said packing assemblies including at least two packing rings each formed of a first face and an opposite second face with the respective first faces adapted for mating contact and the respective opposite second faces being planar-shaped, each of said packing assemblies disposed in said packing bore with the first faces of the packing rings facing each other at the inner portion of the packing assemblies, and the respective planar-shaped second faces of the packing rings at the opposite outer ends of the packing assemblies;

passage means for communicating the exterior of said valve body with said packing bore and said valve stem, including a lantern ring between said pair of packing assemblies;

at least one flat, substantially planar, symmetrical, anti-extrusion wiper ring surrounding said valve stem at each respective outer end of said pair of packing assemblies and between said lantern ring and each respective inner end of said pair of packing assemblies, each of said anti-extrusion wiper rings engageably contacting a respective planar-shaped second face thereof of said packing ring, said anti-extrusion wiper rings each formed of high temperature organic or inorganic fiber material with a nitrile elastomeric binder suitable for normal valve operation in environments having temperature ranges around 450° F. (232° C.) and having an inner diameter sized to form an interference fit with the valve stem to wipe the valve stem, inhibit packing extrusion, and contain any packing extrusion between said anti-extrusion wiper rings at each respective outer end of said pair of packing members during normal valve operation; and a seal element being disposed above and below each pair of said anti-extrusion wiper rings at each respective outer end of said pair of packing assemblies, each of said seal elements surrounding and engageably contacting said valve stem.

2. A fluid valve according to claim 1, wherein each of said anti-extrusion wiper rings has a hardness rating of 90±5 Shore "B" Durometer.

3. A fluid valve according to claim 2, wherein each of said first faces of said packing rings is formed with a V-shape.

4. A fluid valve for use in high pressure and high temperature conditions around 7200 psi (506 kscm) and 450° F. (232° C.), said fluid valve comprising:

a valve body;

a valve shaft movably mounted within said valve body for operating said valve;

a packing bore within said valve body to surround the outer diameter of said valve shaft;

packing loading means as opposite ends of said packing bore, including a spring element at one packing bore end;

at least two synthetic resin polymer packing members in said packing bore formed of TFE material for normal valve operation in environments having temperature ranges around 450° F. (232° C.) and surrounding the outer diameter of said valve shaft between said packing loading means, each of said packing members formed of a first face and an opposite second face with the respective first faces adapted for mating contact and the respective opposite second faces being planar-shaped, said packing members assembled and disposed in said packing bore with the first faces facing each other at the inner portion of the packing member assembly, and the respective planar-shaped second faces at the opposite outer ends of the packing members assembly, said spring element having one end in loading contact with a respective end of the packing members assembly;

at least one flat, thin, symmetrical, antiextrusion wiper ring surrounding said valve shaft at each respective outer end of the packing members assembly and between said spring element one end and engageably contacting a respective planar-shaped second face thereof, said anti-extrusion wiper rings each formed of high temperature organic or inorganic fiber material with a nitrile elastomeric binder suitable for normal valve operation in environments having temperature ranges around 450° F. (232° C.) and having an inner diameter sized to form an interference fit with the valve shaft to wipe the valve shaft, inhibit packing extrusion, and contain any packing extrusion between said anti-extrusion wiper rings at respective outer ends of the packing members assembly during normal valve operation; and a respective seal element being disposed above one of said anti-extrusion wiper rings at one outer end of the packing members assembly and below the other end of said spring element, each of said seal elements surrounding and engageably contacting said valve stem.

5. A fluid valve according to claim 4, wherein each of said anti-extrusion wiper rings has a hardness rating of 90±5 Shore "B" Durometer.

6. A fluid valve according to claim 5, wherein each of said first faces of said packing members is formed with a V-shape.

* * * * *

UNITED STATES PATENT AND TRADEMARK OFFICE
CERTIFICATE OF CORRECTION

PATENT NO. : 4,886,241

DATED : December 12, 1989

INVENTOR(S) : JAMES R. DAVIS, ET AL.

It is certified that error appears in the above-identified patent and that said Letters Patent is hereby corrected as shown below:

On the title page:

In the list of References Cited, after the list of U.S. PATENT DOCUMENTS, insert the following:

OTHER PUBLICATIONS

"Instruction Manual", Fisher Controls, Designs EHD, EHS & EHT, December 1985 (pages 1, 5, 13, 14, 15).

Signed and Sealed this

Twenty-fourth Day of September, 1991

*Attest:*

HARRY F. MANBECK, JR.

*Attesting Officer*     *Commissioner of Patents and Trademarks*